United States Patent
Massey, Jr. et al.

(10) Patent No.: US 10,503,617 B2
(45) Date of Patent: Dec. 10, 2019

(54) METHOD FOR SYNCHRONIZING REDUNDANT CONTROLLERS WITHOUT HARDWARE SUPPORT

(71) Applicant: Honeywell International Inc., Morris Plains, NJ (US)

(72) Inventors: William Russell Massey, Jr., Levittown, PA (US); Raj Bandekar, Lansdale, PA (US)

(73) Assignee: Honeywell International Inc., Morris Plains, NJ (US)

( * ) Notice: Subject to any disclaimer, the term of this patent is extended or adjusted under 35 U.S.C. 154(b) by 50 days.

(21) Appl. No.: 15/435,215

(22) Filed: Feb. 16, 2017

(65) Prior Publication Data
US 2018/0232166 A1     Aug. 16, 2018

(51) Int. Cl.
*G06F 11/20*     (2006.01)
*G05B 19/042*    (2006.01)

(52) U.S. Cl.
CPC ...... *G06F 11/2043* (2013.01); *G05B 19/0428* (2013.01); *G06F 11/2005* (2013.01); *G06F 11/2033* (2013.01); *G06F 11/2038* (2013.01); *G06F 11/2097* (2013.01); *G05B 2219/24186* (2013.01)

(58) Field of Classification Search
CPC .................................. G06F 3/06; G06F 11/20
USPC ........................................................ 711/162
See application file for complete search history.

(56) References Cited

U.S. PATENT DOCUMENTS

| | | |
|---|---|---|
| 4,958,270 A | 9/1990 | McLaughlin et al. |
| 4,959,768 A | 9/1990 | Gerhart |
| 5,016,244 A | 5/1991 | Massey, Jr. et al. |
| 5,088,021 A | 2/1992 | McLaughlin et al. |
| 5,136,498 A | 8/1992 | McLaughlin et al. |
| 5,142,470 A | 8/1992 | Bristow et al. |
| 5,168,443 A | 12/1992 | McLaughlin et al. |
| 5,202,822 A | 4/1993 | McLaughlin et al. |
| 5,210,756 A | 5/1993 | Kummer et al. |
| 5,255,388 A | 10/1993 | McLaughlin et al. |
| 5,261,092 A | 11/1993 | McLaughlin et al. |
| 5,426,774 A | 6/1995 | Banerjee et al. |

(Continued)

OTHER PUBLICATIONS

Yang D. (2001) Operator Overloading. In: C++ and Object-Oriented Numeric Computing for Scientists and Engineers. Springer, New York, NY (Year: 2001).*

*Primary Examiner* — Nanci N Wong
*Assistant Examiner* — Jonah C Krieger

(57) ABSTRACT

An industrial process control system comprises a primary controller coupled with a buffer and a primary memory. The primary controller is configured to create at least one redundant data type based on at least one base data type. The at least one redundant data type includes tracked operators that are different from corresponding operators of the at least one base data type. The tracked operators include an assignment function that is a same assignment function performed by the corresponding operators of the at least one base data type, and a transfer function. The primary controller is further configured to perform the assignment function on a piece of data to assign the piece of data to an address in the primary memory, perform the transfer function to transfer the piece of data to a buffer, and transfer contents of the buffer to a backup memory.

17 Claims, 3 Drawing Sheets

(56) References Cited

U.S. PATENT DOCUMENTS

| | | | |
|---|---|---|---|
| 5,806,997 A * | 9/1998 | Kawanabe | B41J 2/30 |
| | | | 347/5 |
| 6,108,853 A | 8/2000 | Dittus | |
| 6,170,044 B1 | 1/2001 | McLaughlin et al. | |
| 6,272,386 B1 | 8/2001 | McLaughlin et al. | |
| 6,351,829 B1 | 2/2002 | Dupont et al. | |
| 6,415,418 B1 | 7/2002 | McLaughlin et al. | |
| 8,046,548 B1 * | 10/2011 | Chatterjee | G06F 11/2064 |
| | | | 707/655 |
| 2014/0237170 A1 * | 8/2014 | Okita | G06F 12/0246 |
| | | | 711/103 |
| 2014/0289459 A1 * | 9/2014 | Yamamoto | G06F 3/0608 |
| | | | 711/103 |
| 2017/0123991 A1 * | 5/2017 | Sela | G06F 12/0246 |

* cited by examiner

METHOD FOR SYNCHRONIZING REDUNDANT CONTROLLERS WITHOUT HARDWARE SUPPORT

TECHNICAL FIELD

This disclosure relates generally to industrial process control and automation systems. More specifically, this disclosure relates to systems and methods for facilitating redundant control of industrial process control and automation systems.

BACKGROUND

Industrial process control and automation systems are routinely used to automate large and complex industrial processes. These types of systems typically include sensors, actuators, and controllers. Controllers are often arranged in redundant pairs operating to provide fail-safe operation. Data is mirrored from a primary storage device of the primary controller to a secondary storage device of the secondary controller in real time so that there is as little downtime as possible in the process if the primary controller fails.

SUMMARY

This disclosure provides systems and methods for facilitating redundant control of industrial process control and automation systems.

In a first embodiment, a system includes a primary controller coupled with a buffer and a primary memory. The primary controller is configured to create at least one redundant data type based on at least one base data type. The at least one redundant data type includes tracked operators that are different from corresponding operators of the at least one base data type. The tracked operators include an assignment function that is a same assignment function performed by the corresponding operators of the at least one base data type, and a transfer function. The primary controller is further configured to perform the assignment function on a piece of data to assign the piece of data to an address in the primary memory, perform the transfer function to transfer the piece of data to a buffer, and transfer contents of the buffer to a backup memory.

In a second embodiment, a method includes creating at least one redundant data type based on at least one base data type. The at least one redundant data type includes tracked operators that are different from corresponding operators of the at least one base data type. The tracked operators of the at least one redundant data type include an assignment function that is a same assignment function performed by the corresponding operators of the at least one base data type. The tracked operators of the at least one redundant data type further include a transfer function. The method further includes performing the assignment function on a piece of data to assign the piece of data to an address in a primary memory, performing the transfer function to transfer the piece of data to a buffer, and transferring contents of the buffer to a backup memory.

In a third embodiment, a non-transitory computer readable medium embodies a computer program, and the computer program includes computer readable program code that when executed causes at least one processing device to create at least one redundant data type based on at least one base data type. The at least one redundant data type includes tracked operators that are different from corresponding operators of the at least one base data type. The tracked operators of the at least one redundant data type include an assignment function that is a same assignment function performed by the corresponding operators of the at least one base data type. The tracked operators of the at least one redundant data type further include a transfer function. The program code when executed further causes the at least one processing device to perform the assignment function on a piece of data to assign the piece of data to an address in a primary memory, perform the transfer function to transfer the piece of data to a buffer, and transfer contents of the buffer to a backup memory.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
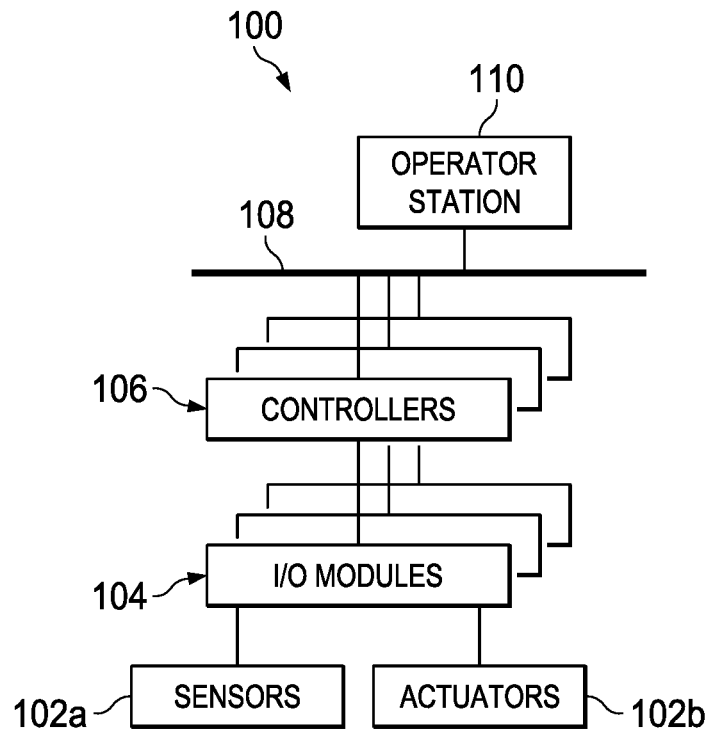
FIG. 1 illustrates a portion of an example industrial process control and automation system according to this disclosure.

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

In memories used in industrial process controllers, a cache is a high-speed buffer for lower speed Random Access Memory (RAM). A cache holds data that a processor of a controller has recently used or is likely to use, for example by prefetching data from a RAM that the processor is likely to use. A cache can greatly improve processing speed by reducing memory read and write times of such data.

Data is read from and written to a cache in chunks called cache lines. For example, a cache line may be a 32 byte length piece of data, though it is understood that a cache line may be of any appropriate length. When the processor is expected to use new data that is stored in a RAM, a cache line containing that data is read from the RAM into the cache. In some embodiments, an algorithm (e.g., a Least-Recently-Used algorithm) determines which existing cache line will be replaced with the new data.

Data may be written from the cache to the RAM in various manners. A copy-back or write-back caching mode avoids writing cache data to RAM until the cache line containing that data is needed to store new data, or until a flush of the cache is initiated by a software process. A cache flush operation forces all cache lines containing modified data (i.e., data that is changed from the data stored in RAM) to be written to the RAM. When data is written from the cache to the RAM in copy-back or write-back mode, even if only a single byte of data in a cache line is modified, the entire cache line is written back to the RAM. The cache flush may be initiated periodically to ensure that all changes to the data (i.e., all modified data) are written from the cache to the RAM.

A write-through (or write-thru) caching mode differs from a copy-back/write-back caching mode. In write-through caching mode, when data in the cache is modified, the modified data is written to the cache and is also immediately written to the RAM (which may be referred to as "writing through" to the RAM). Only the changed data (e.g., the changed byte, word, etc. of data) is written through, meaning that the rest of the cache line is not written from the cache to the RAM. In this way, when data is written from the cache to the memory in write-through mode, the amount of data to be transferred is much lower than in the copy-back/write-back mode. Additionally, a cache flush is not needed to ensure that all modified data is written from the cache to the RAM in write-through mode, because by design all changes to the data are written to the RAM as they occur.

Write-through mode may be preferable to copy-back/write-back mode for writing changes in the cache to the RAM, because write-through mode reduces the amount of data to be transferred when changes are made and because a time consuming cache flush operation is not necessary. However, some processor architectures support copy-back/write-back caching mode, but do not support write-through caching mode. In such architectures, the only hardware-based options are to operate without a cache—reducing processing speed—or to operate in copy-back/write-back caching mode—adding overhead in the form of large data transfers and large amounts of time needed to periodically flush the cache. In cases where accepting such overhead is impractical (e.g., in industrial process control systems where such slowdowns are unacceptable), an alternative method to emulate write-through caching in software may be useful.

FIG. 1 illustrates a portion of an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one input/output (I/O) module 104 is coupled to the sensors 102a and actuators 102b. The I/O modules 104 facilitate interaction with the sensors 102a, actuators 102b, or other field devices. For example, an I/O module 104 could be used to receive one or more analog inputs (AIs), digital inputs (DIs), digital input sequences of events (DISOEs), or pulse accumulator inputs (PIs) or to provide one or more analog outputs (AOs) or digital outputs (DOs). Each I/O module 104 includes any suitable structure(s) for receiving one or more input signals from or providing one or more output signals to one or more field devices. Depending on the implementation, an I/O module 104 could include fixed number(s) and type(s) of inputs or outputs or reconfigurable inputs or outputs.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O module(s) 104. The controllers 106 may be coupled to the I/O module(s) 104 via Ethernet, backplane communications, serial communications, or the like. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a MICROSOFT WINDOWS operating system, or other operating system.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

Although FIG. 1 illustrates a portion of one example industrial process control and automation system 100, various changes may be made to FIG. 1. For example, various components in FIG. 1 could be combined, further subdivided, rearranged, or omitted and additional components could be added according to particular needs. Also, while FIG. 1 illustrates one example operational environment in which redundant controllers could be used, this functionality could be used in any other suitable system.

Figure 2:
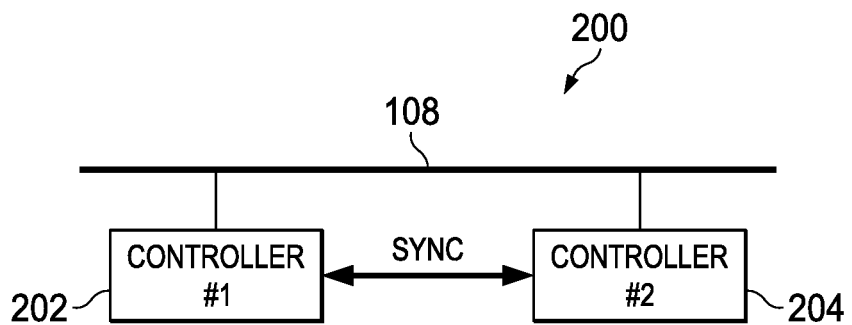
FIG. 2 illustrates an example controller group having redundant process controllers according to this disclosure.

FIG. 2 illustrates an example controller group 200 having redundant process controllers for industrial control networks according to this disclosure. For ease of explanation, the controller group 200 is described as being used in the industrial process control and automation system 100 of FIG. 1. However, the controller group 200 could be used in any other suitable system. The example controller group 200 operates at Level 1 of the Purdue model, and among other things, the example controller group 200 may use the measurements from the one or more sensors 102a to control the operation of one or more actuators 102b.

As shown in FIG. 2, the controller group 200 includes a pair of redundant controllers 202-204. The controllers 202-204 may represent, or be represented by, various ones of the controllers 106 of FIG. 1. The pair of controllers 202-204 is connected to the one or more networks 108, such as FTE, IEC-61850, IEC-62439, Ethernet/IP, or MODBUS/TCP networks. These controllers 202-204 could communicate with the sensors 102a and implement control logic for controlling the actuators 102b.

In this example, a private network facilitates communication between the controllers 202-204. For example, each controller 202-204 could be joined with a private medium access control (MAC) network to form a private and secure network between controllers. The private network can transport synchronization data between the controllers 202-204 so that a secondary one of the controllers 202-204 is synchronized with a primary one of the controllers 202-204. This allows the secondary controller 202-204 to take over operations for the primary controller 202-204 upon a failure of the primary controller. Each controller 202-204 can operate in the primary or secondary mode of operation. The private network includes any suitable structure for transporting data between networked devices.

Each controller 202-204 includes any suitable structure configured to perform control operations in an industrial process control and automation system. For example, the controllers 202-204 could represent ARM or x86 architecture based controllers that do not use data caching, or that only support copy-back or write-back caching.

Although FIG. 2 illustrates an example of a controller group 200 having redundant process controllers for industrial control networks, various changes may be made to FIG. 2. For example, a controller group 200 could include more or fewer controllers. Also, any suitable number and configuration of other network devices could be used to interconnect the controllers in a controller group.

Figure 3:
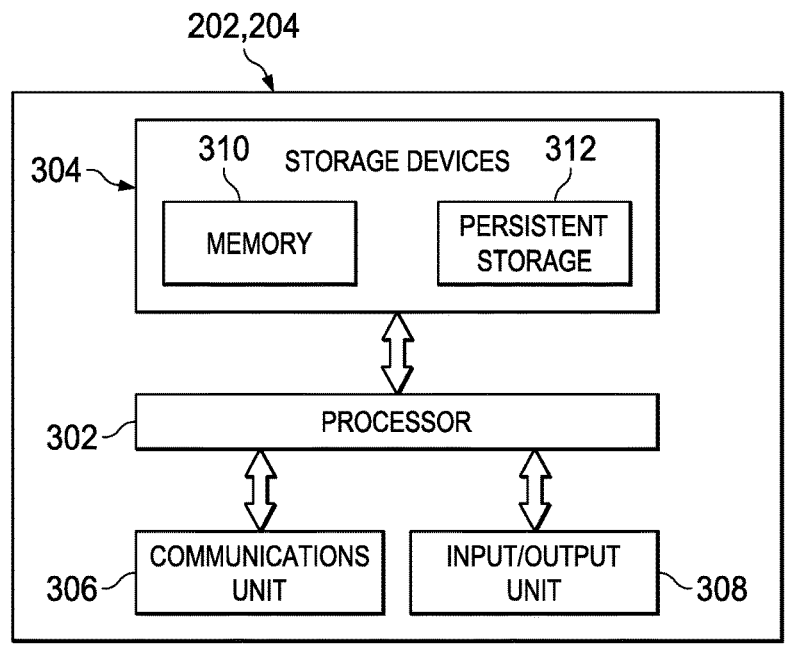
FIG. 3 illustrates an example controller for control and automation systems in industrial plants according to this disclosure.

FIG. 3 illustrates an example controller 202 or 204 for control and automation systems in industrial plants according to this disclosure. However, the controller 202 or 204 could be used in any other suitable system.

As shown in FIG. 3, the controller 202 or 204 includes at least one processor 302, at least one storage device 304, at least one communications unit 306, and at least one input/output (I/O) unit 308. Each processor 302 can execute instructions, such as those that may be loaded into a memory 310. Each processor 302 denotes any suitable processing device, such as one or more microprocessors, microcontrollers, digital signal processors, application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory, a buffer or cache, or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include at least one network interface card or wireless transceiver facilitating communications over at least one wired or wireless network, such as the network 108. The communications unit 306 may support communications through any suitable physical or wireless communication link(s).

The I/O unit 308 allows for input and output of data. For example, the I/O unit 308 may allow the controller 202 or 204 to perform process I/O similar to, or in place of, I/O modules 104, as described above. In other embodiments, the I/O unit 308 may provide a connection for user input through a keyboard, mouse, keypad, touchscreen, or other suitable input device. The I/O unit 308 may also send output to a display, printer, or other suitable output device. The user input and output devices for controllers that interface with an operator may, for example, be included in the operator station 110.

Although FIG. 3 illustrates one example of a controller 202 or 204 for control and automation systems in industrial plants, various changes may be made to FIG. 3. For example, various components in FIG. 3 could be combined, further subdivided, rearranged, or omitted and additional components could be added according to particular needs. Also, computing devices come in a wide variety of configurations, and FIG. 3 does not limit this disclosure to any particular configuration of computing device.

In some embodiments of the present disclosure, a controller 202 or 204 may not support a hardware-based write-through caching mode of operation. As described above, a write-through caching mode of operation causes any changes in data that are written to a storage (e.g., to a RAM) by a primary controller to be immediately mirrored into a buffer, or cache. When the buffer has fulfilled a predetermined condition (e.g., it has reached a predetermined capacity or a predetermined number of changes have been written to it) the write-through caching operation causes the buffer contents to be written into a backup memory. In this way, a controller that supports write-through caching can keep a "live" backup of any process changes so that, if the controller fails, a secondary redundant controller can immediately take over the process control.

For simplicity, the controller 202 will be referred to as a primary controller and the controller 204 will be referred to as a secondary controller. The controllers 202 and 204 form a one-to-one redundant pair, meaning that the secondary controller 204 provides transparent redundancy to the process control system 100 in case the primary controller 202 fails. When the controllers 202 and 204 do not support a hardware write-through cache mode of operation, a replacement software operation may be implemented according to various embodiments of this disclosure.

Figure 4:
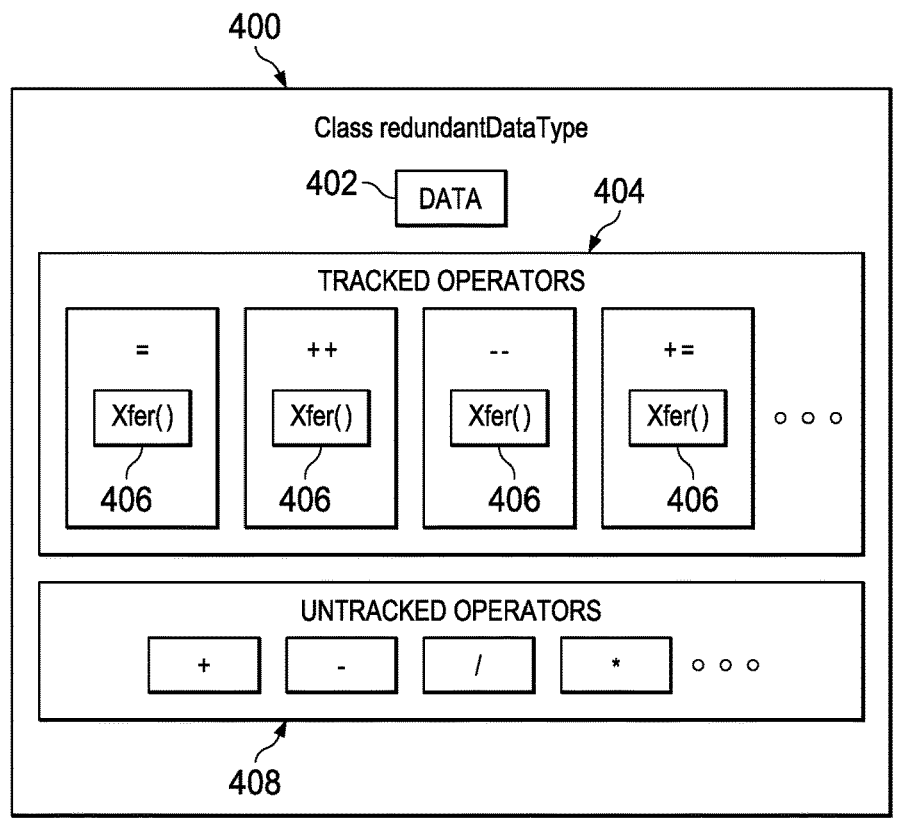
FIG. 4 is an illustration of an example redundant data type created to simulate write-through cache operation in software according to this disclosure.

FIG. 4 is an illustration of an example redundant data type 400 created to simulate write-through cache operation in software according to this disclosure. A computer program containing redundant data type 400 runs on a primary controller of a one-to-one redundant pair, such as primary controller 202. A data type may refer to, for example, a software programming language construction of a specific type of data such as an integer, a floating point number, a string, or the like, including arithmetical functions for use with the type of data. For simplicity, the example of FIG. 4 is implemented in the C++ programming language, but it is understood that any appropriate programming language may be used to simulate a write-through cache operation in software. Preferably, a programming language that allows overloading of operators and that has type inheritance may be used.

In the example of FIG. 4, the redundant data type 400 is implemented as a class in C++. The redundant data type 400 contains at least one data variable 402. The redundant data type 400 may be any data type implemented in C++, including various bit-size (e.g., 8, 16, 32, 64 bit) signed and unsigned integers, floating point numbers, strings, or the like. In some embodiments, the redundant data type 400 is created as a subclass of an existing default C++ data type, which allows the example redundant data type 400 to inherit features of the default data type, thereby reducing the work required to create a fully functional redundant data type 400.

The example redundant data type 400 utilizes overloading of operators in order to emulate a write-through cache operation. In a programming language such as C++, operators (e.g., +, −, ++, −−, +=, −=) may be "overloaded," meaning they have different or additional functions added to the default functions of the operator. These different or additional functions may only operate on certain types of information, and a program that uses overloaded operators is able to recognize when to apply the overloaded operator and when to apply the default operator. For example, if the multiplication operator is overloaded only for 32 bit unsigned integers, then the overloaded multiplication operator will be applied when a multiplication operation is called by a program for 32 bit unsigned integers, but the default multiplication operator will be applied when a multiplication operation is called by the program for other types of data.

A set of tracked operators 404 are each overloaded with a redundant transfer function 406. In this example, the tracked operators 404 include any operators that result in an assignment of a value to memory. This includes, for example, assignment (=) increment (++), decrement (−−), subtract and assign (−=), add and assign (+=), multiply and assign (*=), divide and assign (/=), and the like. For these operators, an additional redundant transfer function 406 is overloaded onto the operator so that the operator performs its default function (for example, assigning data to a certain address in a primary storage device) and additionally sends assigned data along with the address of the assignment location and the size of the data to a backup memory. In some embodiments, the redundant transfer function 406 transfers this information to a buffer connected to the primary controller 202, and the buffer contents are periodically transferred into a backup memory connected to the secondary controller 204. Use of the buffer and periodic bulk transfers from the buffer to the backup memory reduce load on transfer circuitry connecting the primary controller to the backup memory.

In the example of FIG. 4, a different redundant transfer function 406 is used for each different data type (e.g., 32 bit unsigned integer, 64 bit unsigned integer, etc.). Using a 32 bit unsigned integer data type as an example, the corresponding redundant transfer function 406 may receive as an input an address in the primary storage device of assigned data, read 32 bits beginning at the received address, and write those 32 bits to the buffer. Use of a different redundant transfer function 406 for each data type may therefore facilitate accurately transferring changes of that specific data type to the backup memory. Alternatively, the redundant transfer function 406 may be a single function that contains a plurality of subfunctions to handle each different data type. In some embodiments, the redundant transfer function 406 determines whether assigned data has changed from data that is already in memory, and does not transfer the assigned data to backup memory when there is no change.

In the example of FIG. 4, a set of untracked operators 408 are not overloaded with a redundant transfer function 406. The untracked operators 408 are, for example, arithmetic operators that do not involve any assignment of data to memory. Typically, data that is operated on by these operators will eventually be assigned to memory using an assignment operator of the redundant transfer functions 406, at which point the changes in the data will be tracked and transferred to the backup memory by a tracked operator 404.

Redundant data types 400 operate transparently to the rest of any control program in which they are implemented and to any users of the control program. Existing control program code may be compiled with functional redundant data types 400, and redundancy can be achieved without modifying any other parts of the code of the existing control program. Furthermore, when modifying control programs for software-based redundancy, it is relatively simple to regression test software modified with redundant data types 400.

Figure 5:
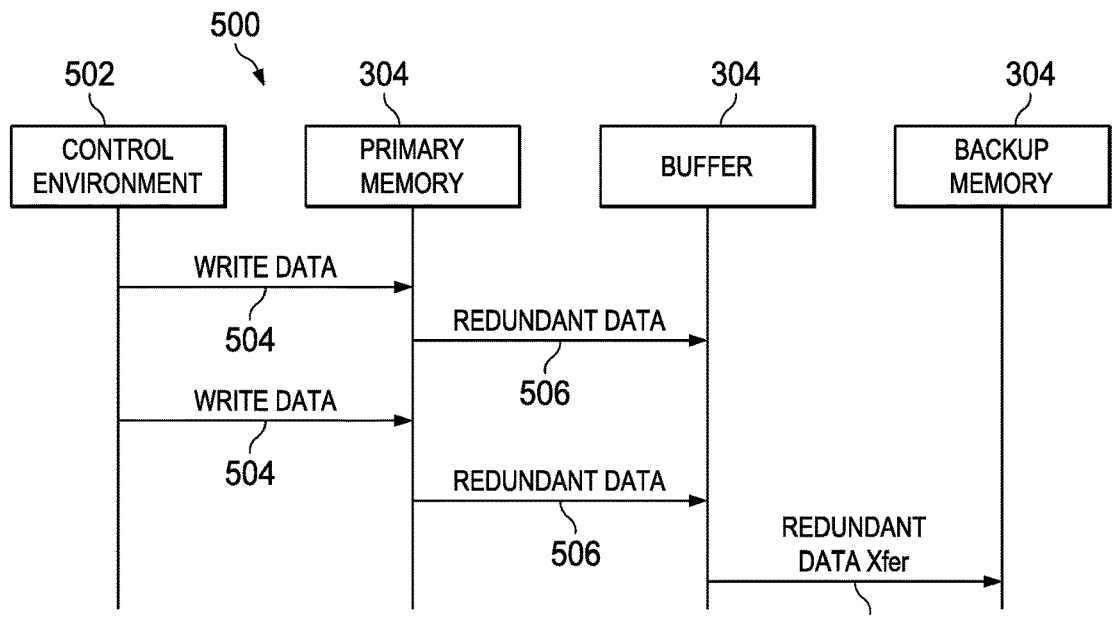
FIG. 5 illustrates a diagram of an example software-based write-through cache operation according to this disclosure.

FIG. 5 illustrates a diagram of an example software-based write-through cache operation 500 according to this disclosure. For ease of explanation, the operation 500 is described with respect to the system 100 of FIG. 1, although the operation 500 could be implemented in any other suitable system. Also, the operation 500 could be implemented using the primary controller 202 and secondary controller 204 of FIGS. 2 and 3, although the operation 500 could be implemented in any other suitable manner.

In this embodiment, a primary controller 202 in a control environment 502 executes industrial control process software (for example, in process control system 100). As a result, the primary controller 202 periodically (e.g., when process states are updated) writes data pertaining to the control environment 502 to a primary memory in process 504. The primary memory, in this embodiment, may be a storage device 304 of the primary controller 202.

When data is written to the primary memory, the primary controller 202 also causes the data to be transferred to a buffer in a process 506. The buffer, in this embodiment, is also a storage device 304 of the primary controller 202 (for example, a more volatile storage than that used for the primary memory).

Once a predetermined amount of data is written to the buffer (e.g., once the buffer reaches a predetermined capacity), the industrial control process software in the primary controller 202 causes the primary controller 202, in process 508, to transfer the contents of the buffer into a longer term backup memory. The backup memory, in this embodiment, is also a storage device 304, preferably one similar to that used as a primary storage of the primary controller 202. The backup memory in this embodiment is associated with the secondary controller 204.

In the event that the primary controller 202 fails, the secondary controller 204 is able to perform the same functions as primary controller 202 and has access to the backup memory, which allows the secondary controller 204 to step into the role of primary controller with very little interruption.

Figure 6:
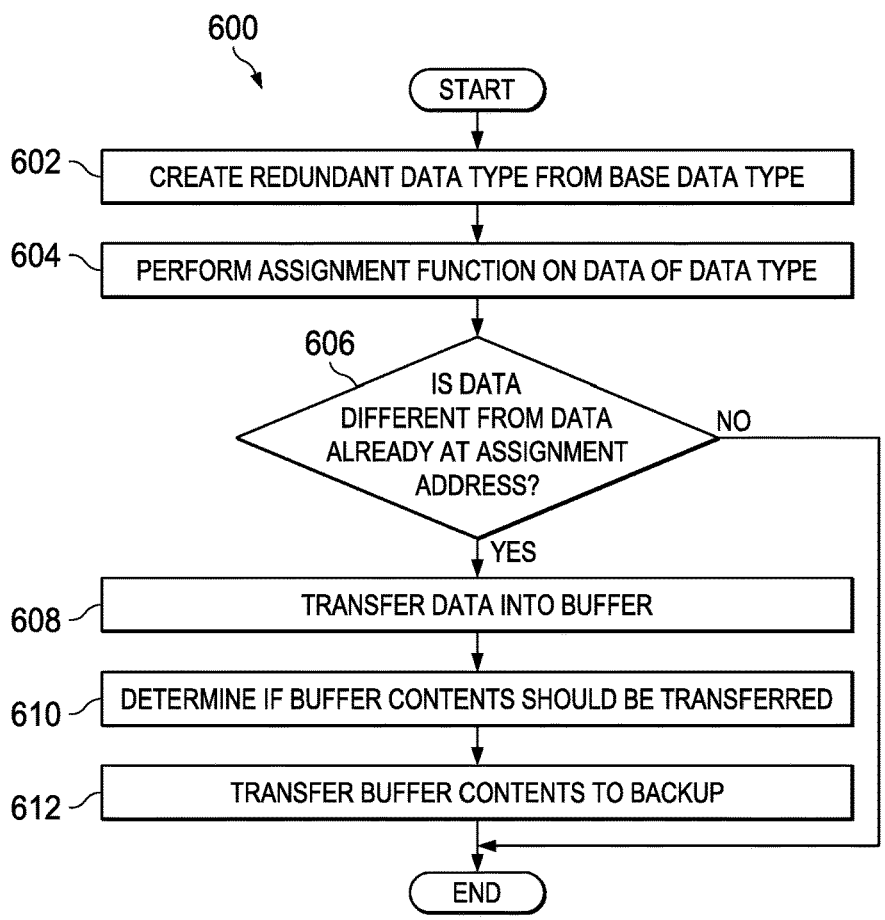
FIG. 6 illustrates a diagram of an example method for industrial process control with software-based redundancy according to this disclosure.

FIG. 6 illustrates a diagram of an example method 600 for industrial process control with software-based redundancy according to this disclosure. For ease of explanation, the method 600 is described with respect to the system 100 of FIG. 1, although the method 600 could be implemented in any other suitable system. Also, the method 600 could be implemented using the controller 202 or 204 of FIGS. 2 and 3, although the method 600 could be implemented in any other suitable manner.

A redundant data type is created from a base data type (for example, 32 bit unsigned integer) at step 602. This could include, for example, instantiating the redundant data type based on code that is stored in a storage device 304 of a primary controller 202 and run by a processor 302 of the primary controller 202. In this example, the redundant data type is a redundant data type 400 as described in FIG. 4. In some embodiments, a redundant data type is created for each base data type that is used in a process control application.

At step 604, an assignment function of the redundant data type 400 is performed on a piece of data to assign the data to an assignment address in a primary memory (such as a storage device 304). For example, the piece of data may represent a process change in the system 100 that is to be assigned to the primary memory. An overloaded assignment operator (for example, one of the tracked operators 404) of the redundant data type 400 is used to perform the assignment function.

At decision step 606, the assignment function of the redundant data type 400 determines whether the data to be assigned to the primary memory is different from data already stored at the assignment address in the primary memory. If the data already stored at the assignment address is the same as the data to be assigned, then the method 600 ends. If the data is different from the data already stored at the assignment address, then the method 600 proceeds to step 608.

At step 608, the assignment function of the redundant data type 400 transfers the data into a buffer (for example, a second storage device 304 of the primary controller 202). This transfer may be facilitated by a redundant transfer function 406 of the tracked operator 404.

At step 610, the assignment function of the redundant data type 400 determines whether the buffer contents should be transferred to a backup memory. In some embodiments, this includes determining that the buffer has reached its capacity, or some predetermined fraction of its capacity. This may facilitate reduced communication overhead by avoiding unnecessary transfers out of the buffer. In other embodiments, the buffer contents may be transferred at regular time intervals. This determination may be facilitated by the redundant transfer function 406 of the tracked operator 404.

At step 612, if the buffer should be cleared, the assignment function of the redundant data type 400 transfers the contents of the buffer to the backup memory. For example, the backup memory may be a storage device 304 associated with a secondary controller 204. This transfer may be facilitated by the redundant transfer function 406 of the tracked operator 404. In this way, changes in data that are written (i.e., assigned) to the primary storage of the primary controller 202 are transparently mirrored to the backup storage of the secondary controller 204, which will be ready to take over process control should the primary controller 202 fail.

Although FIG. 6 illustrates one example of a method 600 for industrial process control with software-based redundancy, various changes may be made to FIG. 6. For example, while shown as a series of steps, various steps in FIG. 6 could overlap, occur in parallel, occur in a different order, or occur any number of times. As a particular example, steps 604-612 could occur repeatedly. As another particular example, steps 606-612 could occur in parallel with step 604.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
    a primary controller coupled with a buffer and a primary memory, the primary controller configured to:
        create at least one redundant data type based on at least one base data type, the at least one redundant data type including tracked operators that are different from corresponding operators of the at least one base data type, the tracked operators of the at least one redundant data type including an assignment function that is a same assignment function performed by the corresponding operators of the at least one base data type, the tracked operators of the at least one redundant data type further including a transfer function that transfers data assigned with the assignment function into a buffer,
        perform the assignment function on a piece of data to assign the piece of data to an address in the primary memory;
        determine whether the data to be assigned to the primary memory is different from the data already stored at the assignment address in the primary memory by:
            receiving the address and size of the piece of data,
            reading the received data size from the primary memory at the received address, and
        perform the transfer function, when data assigned to the primary memory is different from data already stored at the assignment address, to transfer the piece of data to the buffer; and
        transfer contents of the buffer to a backup memory.

2. The system of claim 1, wherein the primary controller is further configured to:
    prior to transferring the contents of the buffer to the backup memory, determine that the buffer has fulfilled a predetermined condition.

3. The system of claim 2, wherein the predetermined condition is that the buffer has reached a predetermined capacity threshold.

4. The system of claim 1, wherein the primary controller is configured to perform the assignment function and the transfer function in parallel.

5. The system of claim 1, wherein the primary controller is further configured to transfer the piece of data to the buffer if the piece of data is different than a piece of data that already exists at the address in the primary memory.

6. The system of claim 1, further comprising a secondary controller coupled to the backup memory.

7. The system of claim 1, wherein the at least one redundant data type further includes untracked operators.

8. A method comprising:
    creating at least one redundant data type based on at least one base data type, the at least one redundant data type including tracked operators that are different from corresponding operators of the at least one base data type, the tracked operators of the at least one redundant data type including an assignment function that is a same assignment function performed by the corresponding operators of the at least one base data type, the tracked operators of the at least one redundant data type further including a transfer function that transfers data assigned with the assignment function into a buffer;
    performing the assignment function on a piece of data to assign the piece of data to an address in a primary memory;
    determine whether the data to be assigned to the primary memory is different from the data already stored at the assignment address in the primary memory by:
        receiving the address and size of the piece of data,
        reading the received data size from the primary memory at the received address, and
    performing the transfer function, when data assigned to the primary memory is different from data already stored at the assignment address, to transfer the piece of data to the buffer; and
    transferring contents of the buffer to a backup memory.

9. The method of claim 8, further comprising:
    prior to transferring the contents of the buffer to the backup memory, determining that the buffer has fulfilled a predetermined condition.

10. The method of claim 9, wherein the predetermined condition is that the buffer has reached a predetermined capacity threshold.

11. The method of claim 8, wherein performing the assignment function and the performing the transfer function occur in parallel.

12. The method of claim 8, wherein the transfer of the piece of data to the buffer is performed if the piece of data is different than a piece of data that already exists at the address in the primary memory.

13. A non-transitory computer readable medium embodying a computer program, the computer program comprising computer readable program code that when executed causes at least one processing device to:
　create at least one redundant data type based on at least one base data type, the at least one redundant data type including tracked operators that are different from corresponding operators of the at least one base data type, the tracked operators of the at least one redundant data type including an assignment function that is a same assignment function performed by the corresponding operators of the at least one base data type, the tracked operators of the at least one redundant data type further including a transfer function that transfers data assigned with the assignment function into a buffer,
　perform the assignment function on a piece of data to assign the piece of data to an address in a primary memory;
　determine whether the data to be assigned to the primary memory is different from the data already stored at the assignment address in the primary memory by:
　　receiving the address and size of the piece of data,
　　reading the received data size from the primary memory at the received address, and
　perform the transfer function, when data assigned to the primary memory is different from data already stored at the assignment address, to transfer the piece of data to the buffer; and
　transfer contents of the buffer to a backup memory.

14. The non-transitory computer readable medium of claim 13, wherein the computer readable program code when executed causes the at least one processing device to:
　prior to transferring the contents of the buffer to the backup memory, determine that the buffer has fulfilled a predetermined condition.

15. The non-transitory computer readable medium of claim 14, wherein the predetermined condition is that the buffer has reached a predetermined capacity threshold.

16. The non-transitory computer readable medium of claim 13, wherein performing the assignment function and the performing the transfer function occur in parallel.

17. The non-transitory computer readable medium of claim 13, wherein the computer readable program code when executed causes the at least one processing device to perform the transfer of the piece of data to the buffer if the piece of data is different than a piece of data that already exists at the address in the primary memory.

* * * * *